B. A. HILLIARD.
HAY BALER.
APPLICATION FILED JULY 17, 1911.

1,085,085.

Patented Jan. 20, 1914.
3 SHEETS—SHEET 3.

Witnesses:
J. P. Wahler.
H. E. Parsons.

Inventor.
B. A. Hilliard.
By Harry Ellis Chandler
Attorney

UNITED STATES PATENT OFFICE.

BIRTUS A. HILLIARD, OF NEW POINT, INDIANA.

HAY-BALER.

1,085,085.  Specification of Letters Patent.  Patented Jan. 20, 1914.

Application filed July 17, 1911. Serial No. 638,956.

*To all whom it may concern:*

Be it known that I, BIRTUS A. HILLIARD, a citizen of the United States, residing at New Point, in the county of Decatur and State of Indiana, have invented certain new and useful Improvements in Hay-Balers, of which the following is a specification.

My invention relates to improvements in hay balers, and has for its leading object the provision of an improved hay baler having secured thereto means for securing the baling wires around the bale as the said bale passes through the baler.

A further object of my invention is the provision of manually controlled mechanism which may be readily applied to an ordinary hay baling machine and which will serve to both feed the baling wires around the bales of hay and will also serve to secure or tie the ends of the wire and to cut the wire from the roll after a portion of the same has been secured on the bale.

Other objects and advantages of my improved hay baler will be readily apparent by reference to the following description taken in connection with the accompanying drawings, and it will be understood that I may make any modifications in the specific structure shown and described within the scope of my claims without departing from or exceeding the spirit of the invention.

Figure 1:
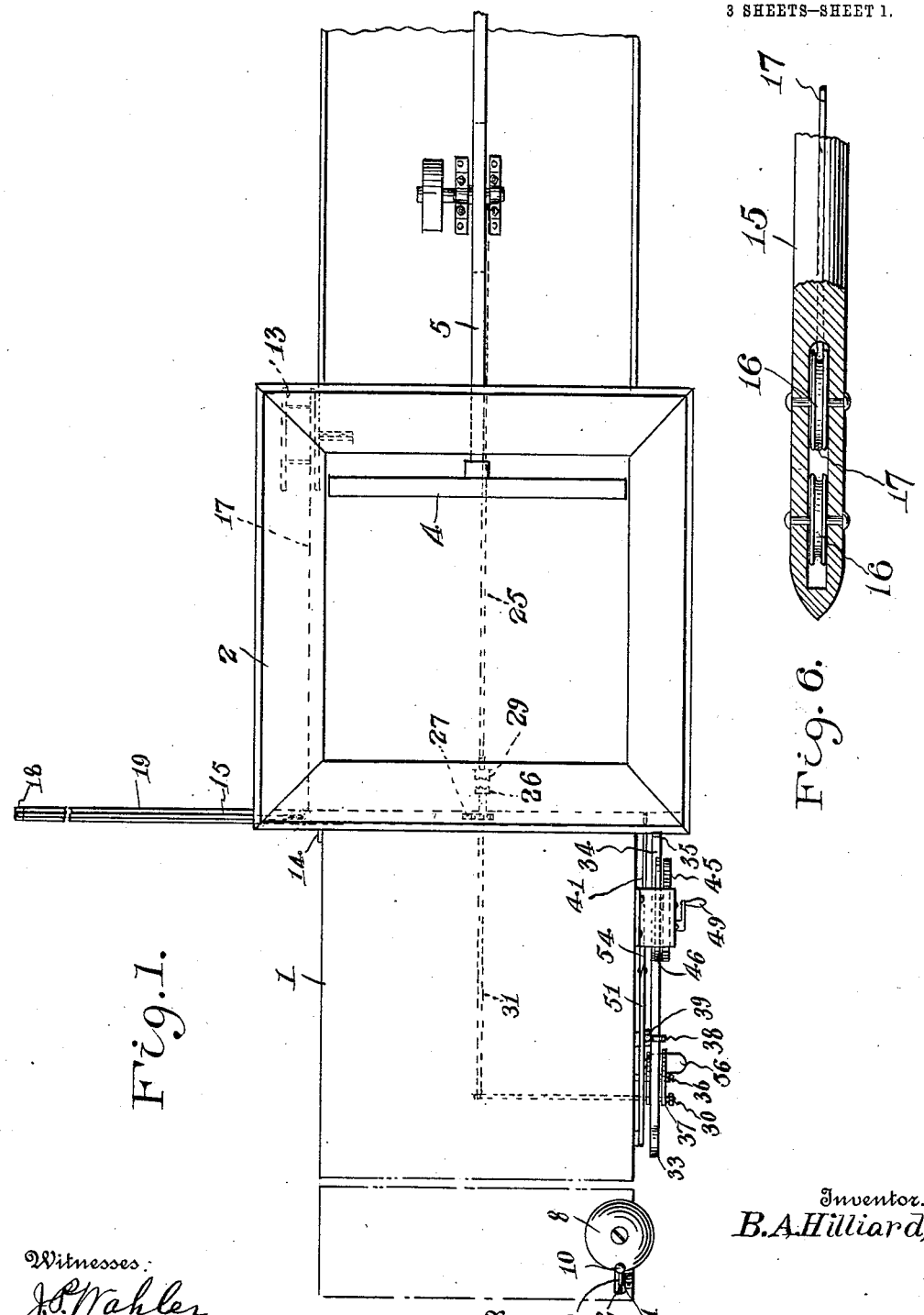
Figure 2:
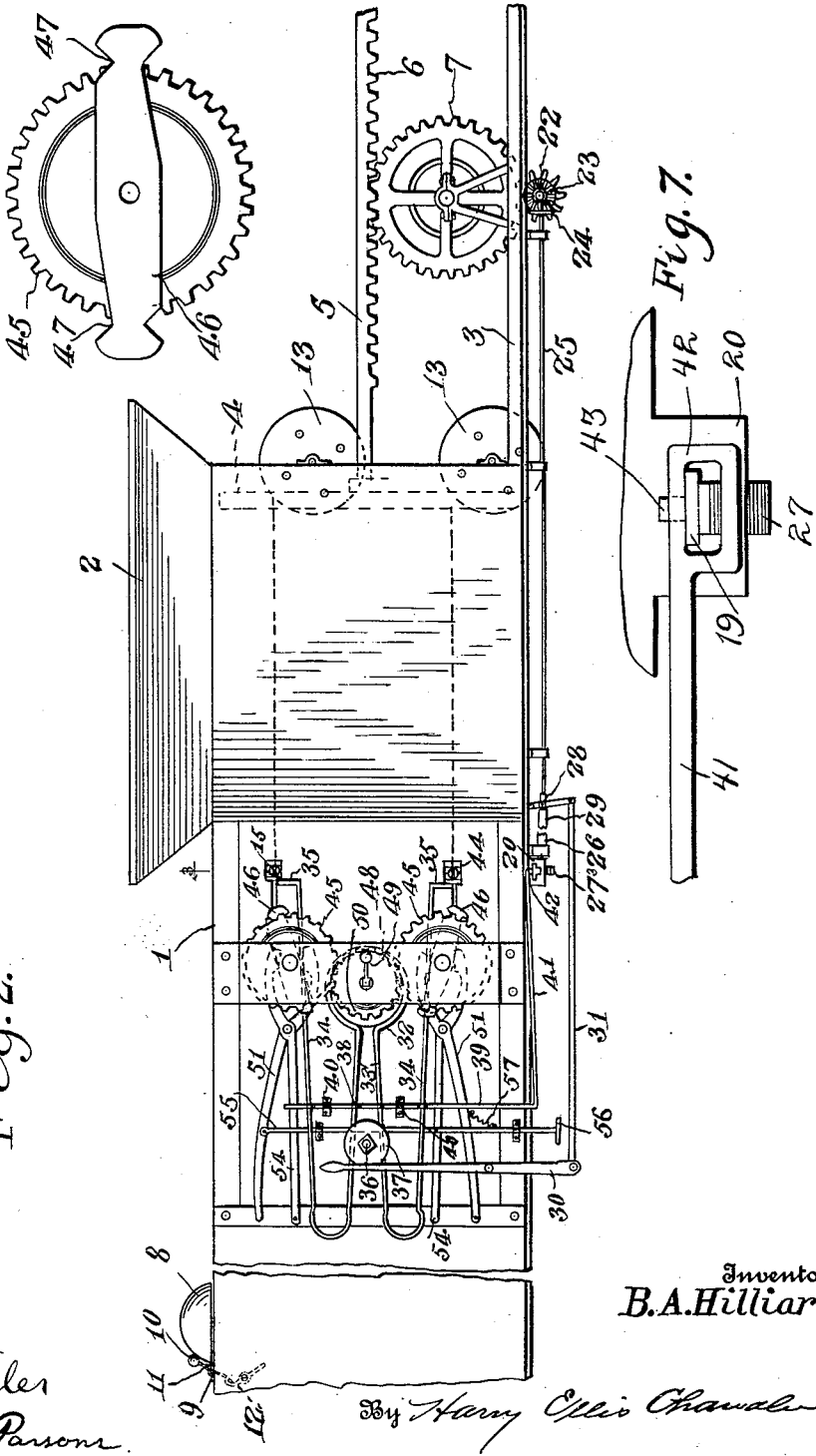
Figure 3:
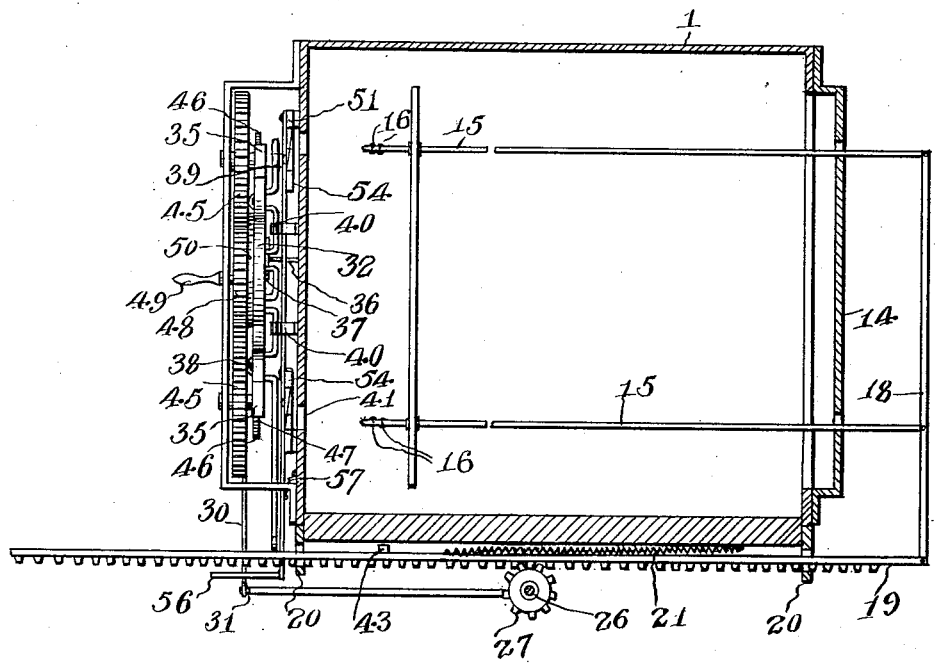
Figure 5:
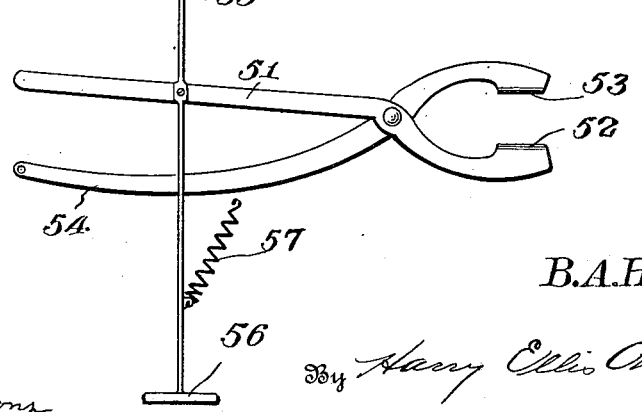

Figure 1 represents a top plan view of a hay baling machine equipped with my improvements. Fig. 2 represents a side elevation thereof. Fig. 3 represents a cross sectional view on the line 3—3 of Fig. 2. Fig. 4 represents a detailed view of one of the knotter wheels removed. Fig. 5 represents a detailed view of one of the wire cutters, and Fig. 6 represents a detailed view on one of the wire carrying needles. Fig. 7 is a detail end view of the rack bar engaging eye.

In the drawings, the numeral 1 designates the frame of the baler having the hopper portion 2 for the introduction of the hay to be baled and having the guides 3 for the packing piston 4, said piston having a piston rod 5 formed with the rack teeth 6 in mesh with the driven gear wheel 7, the driving of said wheel 7 in one direction serving to force the piston inward, while its driving in the other direction withdraws the piston.

To announce when a complete bale has been packed in the baler, I secure to the top of the baler, the gong or bell 8, while pivoted to the baler adjacent the gong is the arm 9 bearing the hammer or clapper 10, a spring 11 serving to force the clapper against the gong to sound the same, while an operating lever 12 is pivoted to the baler and projects into the path of movement of the completed bale whereby when a certain amount of hay is packed in the baler, said hay will contact with and trip the lever 12 which in turn serves to trip the clapper arm and cause it to strike the bell and thus to signal to the user of my device that a complete bale is formed ready for tying.

It will be understood that my bale tying attachment is to be manually controlled and will serve to tie wire from the wire spools 13 around the hay which has been packed by the piston 4. To pass said wires transversely of the baler, I secure to one side of the baler the guide plate 14 having apertures in which the needle members 15 are slidably mounted, said needles each having at one end a pair of slightly spaced guide sheaves 16 over which the wire 17 passes, while the other ends of said needles are connected by the bar 18 which extends downward and is secured to the rack bar 19 slidably engaged in guides 20 secured on the under side of the baler. A spring 21 has one end secured to the rack bar 19 and the other end secured to the baler for normally holding said bar and thus the needles in retracted position.

To cause the operation of the needles, I rotatably secure to the baler the double gear having the gear portion 22 in mesh with the driven gear 7 which operates the piston and having the miter portion 23 in mesh with the miter gear 24 secured on one end of the shaft 25 which extends longitudinally beneath the baler proper. Rotatably mounted upon the said shaft 25 is the sleeve 26 having on one end the gear 27 meshing with the rack portion of the bar 19 and having on the other end the clutch member 28 adapted to be connected with the shaft 25 to rotate therewith by the shifting clutch member 29 carried by the shaft 25, a shifting lever 30 being connected with the clutch 29 by the link 31 for operating said clutch.

As the clutch members 28 and 29 are brought into engagement the sleeve 26 and gear 27 will be rotated to draw the rack bar and thus the needles across the baler, this movement being performed when the gear 7 is rotating in a direction to withdraw the piston 4. To grasp that portion of the wire 17 extending between the two guide sheaves 16 of each needle, I employ my improved catch member comprising a spring steel member having the circular central portion 32 with the outwardly flaring arms 33 which are reversely bent in the portions 34 terminating in the engaging hooks 35. The arms 33 are guided by the bolt 36 having the washer 37 which projects above said arms to allow them to spread or contract with respect to each other and to allow of the sliding movement of the complete wire catching member along the side of the baler while retaining it in position on the baler. The arms 33 are normally held in engagement with the bolt 36 by the off-sets 38 of the rod 39, the arms 33 fitting into said offsets when slid to their outer limit of movement and being drawn together as the device is slid in the opposite direction. Said rod 39 is rotatably supported by the bearing brackets 40 and has the crank end 41 provided with an eye 42 in which the rack bar 19 normally slides, said rack bar having a lug 43 for engaging the eye 42 to rock the arm 41 and thus the rod 39 as the needles are at their limit of movement and have their sheaves 16 projecting through the slot 44 in the opposite side of the baler. As the rod 39 is rocked the arms 33 are disengaged by the offsets 38 and the device spreads outward, the hooks 35 passing between the guide sheaves 16 and retaining the loop of wire.

One end of the wire 17 is normally held by one of the wire tiers of my attachment, said tiers comprising gear wheels 45 rotatably supported on the side of the baler exterior to the wire catching device and having secured to their inner faces the elongated bars or plates 46 having the notches 47 at each end for engaging the strand of wire, the wire thus being held in the said grooves or notches and the rotation of the gear twisting strands held in different notches together to secure the same around a bale. To rotate the upper and lower gears 45 and thus to operate the tying plates to tie both the upper and lower bale wires, I mount between and in mesh with both of the gears 45 the gear 48 having the crank handle 49 for rotating the same, while secured on the under side of the gear 48 is the eccentric 50 which fits within the circular portion 32 of the wire catching device. Upon the rotation of the crank 49 the gear 48 is rotated and the cam 50 engages the wire catcher and forces it rearward, the hooks 35 carrying the wires 17 with them, said wires sliding in the slots 44 until they are in position to be engaged by the tying plates 46, the wires being engaged in the notches 47 and drawn away from the hooks 35 as will be readily understood by reference to the drawings.

To sever the wire after the same has been tied to the bale, I pivot to the baler the cutter arms 51 having on one end the cutter blades 52 to act in conjunction with the blades 53 of the arms 54 which are secured to the sides of the baler, a rod 55 being slidably supported by the baler and having the other ends of the arms 51 pivoted thereto, whereby pressure on the pedal 56 of the rod will shift the rod against the tension of the spring 57 and will cause the cutters to close together like a pair of shears and clip the wire. On account of the position of the said cutters, a twist will be left at the ends of the portion of the wire passing around the bale, while a twist providing a hook will be left on the end of the wire which leads from the spool and is engaged by the tying plate, whereby said hooked end will be held by the tying plate and the hay packed by the piston 4 will cause the wire to be stretched therearound, doing away with the necessity for the insertion of followers between the bales and also holding the end of the wire in position where it may be readily twisted with the loop portion drawn in by the hooks 35.

From the foregoing description taken in connection with the accompanying drawings, the construction and operation of my improved hay baler will be readily understood, and it will be seen that I have provided a simple, practical and efficient attachment for an ordinary baler which will serve to both pass the wires around the pressed bale and which may be manually operated to tie the said wires and cut off the portion of the wire tied to the bale and which will thus prove a thoroughly satisfactory attachment for the desired purposes.

I claim:

1. In a hay baler, the combination with bale forming mechanism, of needles slidably supported by the baler, means for passing the needles transversely of the baler, a spring device having hooked portions for engaging baling wires, means for normally holding said hooked portions out of engaging position against the tension of the spring device, and means for releasing the hooks of the spring device when the needles are in position for their wires to be engaged by the hooks.

2. In a bale press, the combination with bale forming means, of bale wires carrying needles mounted for movement transversely of the baler, manually controlled means for so moving the needles, normally inoperative wire engaging members carried by one side of the baler, means for automatically releasing said engaging devices on the transverse movement of the needles, and wire twisting devices for engaging and twisting the wire held by the said wire engaging devices.

3. In a baler, the combination with bale forming means, of bale wire bearing needles slidably supported by the baler, means for moving the needles transversely of the baler upon the withdrawing movement of the bale forming means, spring devices for engaging the baling wires carried by the needles, gear wheels rotatably secured to the baler, tying devices carried by said gear wheels, an operating gear wheel in mesh with the other gears, a cam carried by the operating gear, and connections between the spring devices and the cam, whereby the rotation of the operative gear serves through the cam to shift the spring device into position where the tiers operated by the rotation of the operative gear will engage the baling wire held by said spring devices.

4. The combination with a baler, of bale wire bearing needles slidably secured thereto, means for moving the needles transversely of the baler, spring wire engaging devices carried by the baler, means for normally holding said devices in inoperative position, trip controlled means for releasing said devices when the needles are at their limit of transverse movement, knot tiers rotatably supported by the baler, and means for simultaneously shifting the wire engaging devices and for causing the knot tiers to engage the wire held by the spring devices, whereby said knot tiers will secure the wire shifted with the said spring wire engaging devices around the bale formed by the baler.

In testimony whereof I affix my signature, in the presence of two witnesses.

BIRTUS A. HILLIARD.

Witnesses:
W. F. FREELAND,
JOHN H. HILLIARD.

---

Copies of this patent may be obtained for five cents each, by addressing the "Commissioner of Patents, Washington, D. C."